(12) United States Patent
Williams et al.

(10) Patent No.: US 8,617,717 B2
(45) Date of Patent: Dec. 31, 2013

(54) HEAT SEALABLE FILMS FROM PROPYLENE AND α-OLEFIN UNITS

(75) Inventors: Michael Glenn Williams, Humble, TX (US); Hans Joachim Pip, Overijse (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 562 days.

(21) Appl. No.: 11/588,204

(22) Filed: Oct. 26, 2006

(65) Prior Publication Data

US 2007/0287007 A1 Dec. 13, 2007

Related U.S. Application Data

(60) Provisional application No. 60/812,409, filed on Jun. 9, 2006.

(51) Int. Cl.
*B32B 27/06* (2006.01)
*B32B 27/32* (2006.01)
*C08L 23/16* (2006.01)

(52) U.S. Cl.
USPC ............ 428/516; 428/523; 525/240; 526/916

(58) Field of Classification Search
USPC ........... 428/349, 355 EN, 515, 516, 523, 343; 525/240; 526/916
See application file for complete search history.

(56) References Cited

U.S. PATENT DOCUMENTS

| | | | |
|---|---|---|---|
| 3,620,825 A * | 11/1971 | Lohmann et al. ............. | 428/336 |
| 3,753,769 A | 8/1973 | Steiner | |
| 4,058,645 A | 11/1977 | Steiner | |
| 4,186,240 A * | 1/1980 | Matsuda et al. .............. | 428/349 |
| 4,214,039 A | 7/1980 | Steiner et al. | |
| 4,289,831 A * | 9/1981 | Last .............. | 428/515 |
| 4,291,092 A | 9/1981 | Weiner .......... | 428/349 |
| 4,297,411 A * | 10/1981 | Weiner .......... | 428/347 |
| 4,339,496 A | 7/1982 | Weiner .......... | 428/349 |
| 4,340,640 A | 7/1982 | Weiner .......... | 428/349 |
| 4,340,641 A | 7/1982 | Weiner .......... | 428/349 |
| 4,377,616 A | 3/1983 | Ashcraft et al. | |
| 4,439,478 A * | 3/1984 | Ferguson et al. ............. | 428/137 |
| 4,439,493 A | 3/1984 | Hein et al. | |
| 4,447,494 A | 5/1984 | Wagner, Jr. et al. | |
| 4,540,753 A | 9/1985 | Cozewith et al. | |
| 4,632,869 A | 12/1986 | Park et al. | |
| 4,643,945 A | 2/1987 | Kiang ............ | 428/349 |
| 4,786,562 A * | 11/1988 | Kakugo et al. ............ | 428/516 |
| 4,961,992 A | 10/1990 | Balloni et al. | |
| 5,019,447 A | 5/1991 | Keller | |
| 5,057,177 A | 10/1991 | Balloni et al. | |
| 5,066,434 A * | 11/1991 | Liu et al. .................. | 264/37.32 |
| 5,230,963 A | 7/1993 | Knoerzer | |
| 5,302,442 A | 4/1994 | O'Brien et al. .............. | 428/213 |
| 5,358,792 A | 10/1994 | Mehta et al. .............. | 428/516 |
| 5,667,902 A | 9/1997 | Brew et al. | |
| 5,681,650 A | 10/1997 | Peiffer et al. ............. | 428/212 |
| 5,759,648 A | 6/1998 | Idlas ............. | 428/34.9 |
| 6,106,938 A * | 8/2000 | Setoh et al. .................. | 428/349 |
| 6,214,447 B1 * | 4/2001 | Nakagawa et al. ........... | 428/215 |
| 6,500,563 B1 * | 12/2002 | Datta et al. .................. | 428/521 |
| 6,503,637 B1 | 1/2003 | Van Loon .................... | 428/516 |
| 6,946,535 B2 | 9/2005 | Tau et al. .................... | 526/348.1 |
| 7,157,522 B2 * | 1/2007 | Datta et al. .................. | 525/240 |
| 2002/0006482 A1 | 1/2002 | Falla et al. .................. | 428/35.2 |
| 2003/0194575 A1 | 10/2003 | Tau et al. .................... | 428/515 |
| 2003/0203230 A1 * | 10/2003 | Pellingra et al. ............. | 428/515 |
| 2003/0207137 A1 | 11/2003 | Kong et al. .................. | 428/515 |
| 2004/0081842 A1 | 4/2004 | Peet ............................. | 428/515 |
| 2004/0236042 A1 | 11/2004 | Datta et al. | |
| 2006/0008643 A1 | 1/2006 | Lin et al. | |
| 2006/0093812 A1 * | 5/2006 | Scheidecker et al. ......... | 428/349 |

FOREIGN PATENT DOCUMENTS

| | | | |
|---|---|---|---|
| CA | 2178104 A * | 12/1996 | |
| EP | 0 221 726 | 5/1987 | ............. B32B 27/32 |
| EP | 0 258 527 | 3/1988 | ............. B32B 27/32 |
| EP | 0 444 339 | 9/1991 | ............. B32B 27/18 |
| EP | 0 575 465 | 12/1993 | ............. C08L 23/08 |
| EP | 0 695 630 | 2/1996 | ............. B32B 27/32 |
| EP | 0 909 637 | 4/1999 | ............. B32B 27/32 |
| EP | 0 963 409 | 12/1999 | ............. C08L 23/16 |

(Continued)

OTHER PUBLICATIONS

Giles, Harold F. Jr.; Wagner, John R. Jr.; Mount, Eldridge, M. III Extrusion—The Definitive Processing Guide and Handbook. (pp. 373). William Andrew Publishing/Plastics Design Library. Online version available at: http://www.knovel.com/knovel2/Toc.jsp?BookID=1176&VerticalID=0.*
O'Neil et al. (Eds.) "Polypropylene." The Merck Index—An Encyclopedia of Chemical, Drugs, and Biologicals. 14th ed. 2006.*
Plastomers for BOPP Sealants, Presented at BOPP Film 2005, May 10-12, 2005. Rasanna De Marco, Dow Chemical (Australia) Limited, and Robert Charrier, Dow Chemical U.S.A. (Texas), 7 pages.

(Continued)

*Primary Examiner* — Callie Shosho
*Assistant Examiner* — John Freeman (57) ABSTRACT

A film structure having a base layer comprising a film-forming thermoplastic polymer; and a heat-seal layer having a seal-initiation temperature less than or about 130° C. and comprising from about 50 to about 98 wt % of a first polymer component and about 2 to about 50 wt % of a second polymer component. The first polymer component comprising propylene-derived units and, optionally, up to about 20 wt % of comonomer units derived from a $C_2$ and/or $C_4$-$C_{20}$ α-olefin, and having a heat of fusion greater than 75 J/g and a melting point greater than or equal to 105° C. The second polymer component comprising at least 75 wt % propylene-derived units, and having a melting point less than 105° C. and a heat of fusion less than 75 J/g.

14 Claims, 2 Drawing Sheets

(56) References Cited

FOREIGN PATENT DOCUMENTS

| | | | | |
|---|---|---|---|---|
| EP | 1 193 053 | 4/2002 | ............. | B32B 27/32 |
| JP | 2003055510 | 2/2003 | ............. | C08L 23/10 |
| JP | 2004136565 | * 5/2004 | | |
| WO | WO 98/21274 | 5/1998 | ............. | C08L 23/04 |
| WO | WO 98/37139 | 8/1998 | ............. | C08L 23/10 |
| WO | WO 98/37140 | 8/1998 | ............. | C08L 23/16 |
| WO | WO 98/37141 | 8/1998 | ............. | C08L 23/16 |
| WO | 99/07788 | 2/1999 | | |
| WO | WO 9907788 A1 * | 2/1999 | ............. | C08L 23/10 |
| WO | WO 01/26896 | 4/2001 | ............. | B32B 27/32 |
| WO | 02/051928 | 7/2002 | | |
| WO | WO 2004039583 | 5/2004 | ............. | B32B 27/32 |
| WO | WO 2004060672 | 7/2004 | ............. | B32B 27/32 |
| WO | WO 2004072176 | 8/2004 | ............. | C08L 23/04 |
| WO | 2006/065664 | 6/2006 | | |

OTHER PUBLICATIONS

Ver Strate et al., "*Near Monodisperse Ethylene-Propylene Copolymers by Direct Ziegler-Natta Polymerization. Preparation, Characterization, Properties,*" Macromolecules 1988, vol. 21, pp. 3360-3371.

* cited by examiner

HEAT SEALABLE FILMS FROM PROPYLENE AND α-OLEFIN UNITS

CROSS REFERENCE TO RELATED APPLICATIONS

This application claims the benefit of Provisional Application No. 60/812,409, filed Jun. 9, 2006, the disclosure of which is incorporated by reference.

FIELD OF THE INVENTION

This invention relates to sealable films, in particular, heat sealable packaging films.

BACKGROUND

Plastic films have found utility in a wide variety of packaging applications such as for example bags, pouches, tubes and trays. In many film applications it is desirable to seal the film during the packaging operation. This may be accomplished by use of adhesives or by using heat sealing techniques. When heat sealing is used, it is important that the plastic film be readily heat sealable while also possessing other good physical and mechanical properties such as resistance to tearing, high tensile strength, and good processability in high speed equipment.

Film heat sealing is generally effected by means of heated flat surfaces, between which the films are forcefully pressed together at a temperature above the seal initiation temperature of the film. When use is made of equipment such as vertical form, fill and seal machines, the bag is filled with the contents to be packaged while the bottom seal is still hot. Cooling the seal would entail too long a waiting time, thus lengthening the cycle time and increasing operating costs. Consequently, the film must be one which enables the formation of a strong seal even as the seal formed is at or near the seal formation temperature.

It is evident that an important characteristic for a heat sealable film is the temperature at which the sealing begins, i.e. the heat seal initiation temperature. It is desired to operate at as low a temperature as possible because (1) it broadens the heat sealable range, (2) it permits higher productivity due to less time for cooling, (3) it requires less energy to heat seal at lower temperature, (4) at a lower heat seal initiation temperature, the film is more forgiving of inadequacies in the heat sealing equipment, and (5) the packaged food/product has less exposure to heat.

Many commonly used plastic materials that are used in the formation of film products could benefit from an improvement of their heat sealing characteristics. For example, crystalline polypropylene films have found extensive use in the field of packaging. Polypropylene films, in both oriented or non-oriented form, are used widely in packaging applications because of their superiority in mechanical properties such as tensile strength, rigidity, and surface hardness, optical properties such as gloss and transparency, and food hygiene such as freedom from toxicity and odor. However, polypropylene films, when coextruded with currently available sealant resins, typically require heat sealing initiation temperatures upwards of about 125° C., before adequate film seal strengths (at least 200 g/in) are obtained.

Considering the above, monolayer and coextruded films employing blends of propylene-based elastomers and polypropylene (PP) resins, and other polyolefin resins, overcome the heat seal limitations of the PP films mentioned above. Specifically, blends of propylene-based elastomers and PP resins, other polyolefin resins, and slip agents and antiblock agents produce monolayer and coextruded film with good mechanical properties, toughness, optical properties, and low coefficient of friction (COF). In addition, good hot tack and relatively low seal initiation temperatures can be obtained.

SUMMARY OF THE INVENTION

Described herein is a film structure comprising (a) a base layer comprising a film-forming thermoplastic polymer; and (b) a heat-seal layer comprising a first polymer component (FPC) and a second polymer component (SPC). Based on the weight of FPC and SPC, the heat-seal layer comprises (i) from about 50 to about 98 wt % FPC, the FPC comprising propylene-derived units, and ≤about 10 wt % of comonomer units derived from a $C_2$ and/or $C_4$-$C_{20}$ α-olefin, the FPC having a heat of fusion >75 J/g and a melting point ≥105° C.; and (ii) from about 2 to about 50 wt % SPC, the SPC comprising at least 75 wt % propylene-derived units, a melting point less than 105° C., a heat of fusion <75 J/g, wherein the heat seal layer has a seal-initiation temperature ≤about 130° C.

DETAILED DESCRIPTION

The film embodiments disclosed herein generally comprise a base layer, which comprises a thermoplastic polymer, and at least one outer or seal layer which comprises (i) from 50 to 98 wt % of a first polymer component as described herein and (ii) from 2 to 50 wt % of a second polymer component as described herein.

First Polymer Component

The outer or seal layer described herein comprises a propylene-α-olefin random copolymer, also referred to herein as the first polymer component (FPC). The FPC may be a propylene homopolymer, a copolymer or terpolymer of propylene, or a mixture thereof. The FPC can be manufactured in any conventional manner using Ziegler-Natta or metallocene catalysts or any other suitable catalyst system. The FPC preferably has the following characteristics:

(a) Melting point generally greater than or equal to about 105° C., greater than or equal to about 110° C., preferably greater than about 115° C., and most preferably greater than about 130° C. Preferably, the FPC has a heat of fusion greater than 75 J/g.

(b) Comonomer content is preferably ≤about 20 wt %, more preferably ≤about 10 wt %, more preferably ≤about 7 wt %, more preferably ≤about 6 wt % comonomer. Suitable ranges of comonomer include from about 0.5 to about 7 wt %, from about 0.5 to about 6 wt %, more preferably from about 0.5 to about 5 wt % comonomer. Other suitable ranges include 2-7, 2-6 and 2-5 wt % comonomer. The preferred alpha-olefin comonomer is ethylene, but $C_4$-$C_{20}$ alpha-olefins are also acceptable comonomers, including, but not limited to, butene, pentene, hexene and octene. The FPC may contain more than one different $C_2$ and/or $C_4$-$C_{20}$ α-olefin. If two different comonomers are present, the total weight % of comonomer is higher and preferably about twice the levels indicated above.

(c) The weight average molecular weight of the FPC can be between about 10,000 and about 5,000,000 with a Mw/Mn from about 1.5 to about 40.

Second Polymer Component

The outer or seal layer described herein further comprises a propylene-α-olefin polymer, which may be a copolymer of propylene-derived units and one or more units derived from a $C_2$ and/or $C_4$-$C_{20}$ α-olefin and optionally one or more diene-derived units. Preferred α-olefins are ethylene, butene, pentene, hexene and octene. This polymer is also referred to herein as the second polymer component or SPC.

Typical comonomer content of the SPC is from about 5 to about 35 wt %. In general, the comonomer content is adjusted so that the polymer preferably has a molecular weight distribution (MWD), Mw/Mn, of from about 1 to about 5, a heat of fusion less than or equal to 75 J/g and a melting point, $T_m$, ≤105° C. In some embodiments, where more than one comonomer is present, the amount of a particular comonomer may be <5 wt %, but the combined comonomer content is preferably >5 wt %.

In such an embodiment, when there is more than one α-olefin-derived unit in the polymer, the total weight percent of the $C_2$ or $C_4$-$C_{20}$ α-olefin-derived units is preferably from about 5 wt % to about 35 wt %, more preferably from about 7 wt % to about 32 wt %, more preferably from about 8 wt % to about 25 wt %, more preferably from about 8 wt % to about 20 wt %, and more preferably from about 8 wt % to about 16 wt %. Particular embodiments of polymers having more than one α-olefin include propylene-ethylene-octene, propylene-ethylene-hexene and propylene-ethylene-butene polymers. These polymers may further comprise a diene as described below.

The SPC can comprise from about 5 to about 25 wt % α-olefin, preferably from about 5 to about 20 wt %, more preferably from about 5 to about 16 wt %, more preferably from about 5 to about 15 wt %, and more preferably from about 6 to about 15 wt % α-olefin. In a preferred embodiment, the propylene-α-olefin copolymer comprises greater than 11 wt % α-olefin.

The SPC can comprise from about 75 to about 95 wt % propylene, preferably from about 80 to about 95 wt %, more preferably from about 84 to about 95 wt %, more preferably from about 85 to about 95 wt %, and more preferably from about 85 to about 94 wt %.

The SPC may optionally comprise ≤10 wt % diene, preferably less than or equal to about 5 wt % diene, more preferably less than or equal to about 3 wt % diene, preferably from about 0.1 to about 3 wt %, more preferably from about 0.1 to about 2 wt %, and more preferably from about 0.1 to about 1 wt % diene. Suitable dienes useful as co-monomers are, for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. The diene is most preferably ENB.

The SPC can have a triad tacticity of three propylene units, as measured by $^{13}$C NMR, of 50% or greater, 75% or greater, 80% or greater, 82% or greater, 85% or greater, or 90% or greater. Preferred ranges include from about 50 to about 99%, more preferably from about 60 to about 99%, more preferably from about 75 to about 99% and more preferably from about 80 to about 99%; and in other embodiments from about 60 to about 97%. Triad tacticity is determined by the methods described in U.S. Patent Application Publication 20040236042.

In a preferred embodiment, the SPC may have a heat of fusion (ΔHf) which is greater than or equal to about 0.5 Joules per gram (J/g), and is less than or equal to about 75 J/g, preferably less than or equal to about 50 J/g, preferably less than or equal to about 35 J/g, preferably less than or equal to about 25 J/g. Preferably the SPCs also have a heat of fusion that is greater than or equal to about 1 J/g, preferably greater than or equal to about 2.5 J/g, preferably greater than or equal to about 5 J/g.

In a preferred embodiment, the SPC has a % crystallinity of from 0.5 to 40, preferably 1 to 30, and more preferably 5 to 25 wherein % crystallinity is determined according to the DSC procedure described herein. For use herein, the crystallinity of the propylene-α-olefin polymer can also be expressed in terms of percentage of crystallinity. The thermal energy for the highest order of polypropylene is estimated at 189 J/g (i.e., 100% crystallinity is equal to 189 J/g). In another embodiment, the propylene-α-olefin polymer of the present disclosure preferably has a crystallinity of less than 40%, preferably about 0.25% to about 25%, more preferably from about 0.5% to about 22%, and most preferably from about 0.5% to about 20%.

In addition to this level of crystallinity, the SPC preferably has a single broad melting transition. The melting point is defined as the temperature of the greatest heat absorption within the range of melting of the sample. However, the SPC may show secondary melting peaks adjacent to the principal peak, but for purposes herein, such secondary melting peaks are considered together as a single melting point, with the highest of these peaks being considered the melting point ($T_m$) of the SPC. The SPC preferably has a melting point of from about 25° C. to 105° C., preferably from 25° C. to about 85° C., preferably from 25° C. to about 75° C., preferably about 25° C. to about 65° C., more preferably about 30° C. to about 80° C., more preferably about 30° C. to about 70° C. and more preferably about 30° C. to about 60° C.

Preferred SPCs may have a Mooney viscosity [ML (1+4)@125° C.], as determined according to ASTM D1646, of less than 100, more preferably less than 75, even more preferably less than 60, most preferably less than 30.

The molecular weight distribution index (MWD=(Mw/Mn)) of the SPC may be about 1 to about 40, more preferably about 1 to about 5, more preferably about 1.8 to about 5 and most preferably about 1.8 to about 3. Techniques for determining the molecular weight (Mn and Mw) and molecular weight distribution (MWD) may be found in U.S. Pat. No. 4,540,753 (Cozewith, Ju and Verstrate) (which is incorporated by reference herein for purposes of U.S. patent practice) and references cited therein and in Macromolecules, 1988, volume 21, p 3360 (Verstrate et al.), which is herein incorporated by reference for purposes of U.S. patent practice, and references cited therein.

Preferred SPCs are available commercially under the trade names Vistamaxx™ (ExxonMobil Chemical Company, Houston, Tex., USA) and Versify™ (The Dow Chemical Company, Midland, Mich., USA).

The Seal Layer Combinations

The seal layer comprises FPC and SPC. The FPC is present in an amount of, based on the total weight of the FPC and SPC, from 50 to about 98 wt %, more preferably from about 60 to about 98 wt %, more preferably from about 70 to about 98 wt %, more preferably from about 75 to about 98 wt %, more preferably from about 80 to about 98 wt %. The SPC is present in an amount of, based on the weight of the FPC and SPC, from 2 to about 50 wt %, more preferably from about 2 to about 40 wt %, more preferably from about 2 to about 30 wt %, more preferably from about 2 to about 25 wt %, more preferably from about 2 to about 20 wt %. The seal layer blends may include additional thermoplastic polymers and/or polyolefins, and/or any additives as described below.

The Base Layer

The base layer of the film structure comprises a polymeric matrix comprising a film-forming thermoplastic polymer. A polyolefin having a melting point, for example, of at least about 140° C. and up to, for example, about 167° C., represents one example of a suitable film-forming polymer for forming the polymeric matrix of the base layer. If the film-forming polymer of the base layer is a polyolefin, the polyolefin preferably has a relatively high degree of crystallinity. A particularly desirable polyolefin that may be used as the film-forming polymer is an isotactic propylene homopolymer having (i) an isotacticity of from about 80 to 99%, (ii) a melting point of from about 155° C. to about 165° C., and (iii) a melt flow of from about 0.5 to about 15 g/10 minutes (as measured according to ASTM D1238). The isotactic propylene polymer may be produced by using Ziegler-Natta or metallocene catalysts. Metallocene-catalyzed isotactic polypropylenes made developmentally or commercially include, but are not limited to, EOD 96-21 and EOD 97-09, from Atofina Petrochemicals, Inc., and EXPP-129, from ExxonMobil Chemical Co. Other suitable commercially available materials include Amoco 9117 and Amoco 9119 (available from Amoco Chemical Co. of Chicago, Ill.), and Chisso HF5010 and Chisso XF2805 (available from Chisso Chemical Co., Ltd. of Tokyo, Japan).

Other suitable film-forming polymers that may be used to form the polymeric matrix of the base layer include, but are not limited to, syndiotactic polypropylene, ethylene-propylene copolymers, ethylene-propylene-butene-1 terpolymers, butylene-ethylene copolymers, functionally grafted copolymers, blends of polymers, etc.

Although it is preferred for the base layer to comprise a polymeric matrix comprising any of the propylene homopolymers, copolymers, or terpolymers described above, in an alternative embodiment, the polymeric matrix of the base layer comprises an ethylene resin, such as a high density polyethylene (HDPE), medium density polyethylene (MDPE), low density polyethylene (LDPE), very low density polyethylene (VLDPE), or linear low density polyethylene (LLDPE).

HDPE is a substantially linear polyolefin having a density of, for example, from about 0.95 g/cm$^3$ or higher, e.g., from about 0.952 g/cm$^3$ to about 0.970 g/cm$^3$, and a melting point of, for example, from about 266° F. to about 299° F. (from about 130° C. to about 148° C.). MDPE has a density in the range of from about 0.926 g/cm$^3$ to about 0.940 g/cm$^3$. LDPE typically has a density in the range of from 0.90 g/cm$^3$ to 0.94 g/cm$^3$, e.g., from 0.910 g/cm$^3$ to 0.926 g/cm$^3$, and a melt index of from less than 1 to 10 g/10 min (as measured according to ASTM D1238). LDPE may be derived solely from ethylene, e.g., in a high pressure, peroxide-catalyzed reaction, or from ethylene together with a comonomer, including but not limited to higher olefin comonomers containing 4 to 10 carbon atoms, e.g., butene-1, hexene-1, or octene-1, e.g., in a gas phase linear low density polyethylene (LLDPE) process or in a solution LLDPE process using Ziegler-Natta, metallocene, or single-site catalysts.

LLDPE typically has: a melt index of from less than 0.2 to 10 g/10 min (as measured according to ASTM D1238) and a density in the range of from 0.88 to 0.94 g/cm$^3$, preferably from 0.89 to 0.92 g/cm$^3$. It may be derived from ethylene together with other higher comonomers, such as butene-1, hexene-1 or octene-1. VLDPE, which is sometimes referred to as ultra low density polyethylene (ULDPE), is a very low density polyethylene typically having a density at or below 0.915 g/cm$^3$, e.g., from about 0.86 to about 0.915 g/cm$^3$. VLDPE is typically produced in a high pressure, peroxide-catalyzed reaction or in a solution process. When produced using a metallocene or single-site catalyst, VLDPE is commonly referred to as a type of plastomer.

The film formed from the base layer may be unoriented, uniaxially oriented, or biaxially oriented. If it is desired to produce an opaque film structure, a cavitating agent(s) can be dispersed within the polymeric matrix of the base layer before extrusion and orientation. A suitable cavitating agent(s) includes any organic or inorganic material that is incompatible with (the term "incompatible" is used in the sense that the materials are two distinct phases), and has a higher melting point than, the polymer matrix of the base layer, at least at the orientation temperature. For example, the cavitating agent(s) may be any of those described in U.S. Pat. Nos. 4,377,616 and 4,632,869, the entire disclosures of which are incorporated herein by reference. Specific examples of the cavitating agent(s) include polybutylene terephthalate (PBT), nylon, an acrylic resin, an ethylene-norbornene copolymer, solid or hollow preformed glass spheres, metal beads or spheres, ceramic spheres, calcium carbonate, and combinations thereof. When the base layer comprising a cavitating agent(s) is subjected to uniaxial or biaxial orientation, a cavity forms, providing a film having an opaque appearance.

The particle size of the cavitating agent(s) may be, for example, from about 0.1 micron to about 10 microns, more preferably from about 0.2 micron to about 2 microns. The cavitating agent(s) may be of any desired shape. For example, the cavitating agent(s) may be substantially spherical. The cavitating agent(s) may be present in the base layer in an amount of less than 30 wt %, for example from 2 wt % to 20 wt %, e.g., from 5 wt % to 10 wt %, based on the total weight of the base layer.

The cavitating agent(s) may be dispersed within the polymeric matrix of the base layer by blending the cavitating agent(s) and the film-forming polymer that provides the polymeric matrix at a temperature above the melting point of the film-forming polymer. This blending may take place in an extruder, such as a co-rotating, intermeshing twin screw extruder.

To preserve the structural integrity of the base layer, a thin layer of the film-forming polymer of the base layer, without the cavitating agent(s), may be coextruded on one or both sides of the film-forming polymer of the base layer. In this case, the total of the cavitating agent(s)-containing layer and the non-cavitating agent(s)-containing layer(s) may be considered the overall base layer of the film.

The base layer may also comprise an opacifying agent(s). Examples of the opacifying agent(s) include iron oxide, carbon black, titanium dioxide, talc, and combinations thereof. The opacifying agent(s) may be present in the base layer in an amount of from 1 to 15 wt %, for example from 1 to 8 wt %, e.g., from about 2 to about 4 wt %, based on the total weight of the base layer. Aluminum is another example of an opacifying agent that may be used in the base layer of the present film structure. Aluminum may be included in the base layer as an opacifying agent in an amount of from 0.01 to 1.0 wt %, e.g., from about 0.25 to about 0.85 wt %, based on the total weight of the base layer.

The base layer may further comprise one or more hydrocarbon resins. The hydrocarbon resin(s) may be present in the base layer in a total amount of from 1 wt % to 15 wt %, for example from 1 wt % to 12 wt %, or from 2 wt % to 6 wt %, based upon the total weight of the base layer.

The hydrocarbon resin(s) may be a low molecular weight hydrocarbon which is compatible with the film-forming polymer of the base layer. The hydrocarbon resin(s) may, optionally, be hydrogenated. The hydrocarbon resin(s) may have a number average molecular weight of less than 5,000, for example less than 2,000, e.g. from 500 to 1,000. The resin(s) may be natural or synthetic and may have a softening point in the range of from 60° C. to 180° C. A specific example of a hydrocarbon resin that may be contained in the present base layer is any of the hydrocarbon resins disclosed in U.S. Pat.

No. 5,667,902 to Brew, et al., which is incorporated herein by reference. Specific examples include, but are not limited to, petroleum resins, terpene resins, styrene resins, and cyclopentadiene resins. Examples of commercially available hydrogenated resins include PICCOLYTE, REGALREZ, and REGALITE, each of which is available from Hercules Corp., and ESCOREZ, available from ExxonMobil Chemical Co.

A saturated alicyclic resin is an additional example of a hydrocarbon resin that may be included in the base layer of the present film structure. Saturated alicyclic resins have a softening point in the range of from 85° C. to 140° C., for example from 100° C. to 140° C., as measured by the ring and ball technique. An example of a commercially available saturated alicyclic resin is ARKON-P, available from Arakawa Forest Chemical Industries, Ltd. of Japan.

The base layer of the film is of sufficient thickness to provide bulk properties, such as barrier, stiffness, etc., that are desired for product protection and good performance on packaging equipment. In preferred embodiments, the thickness of the base layer ranges from about 50% to about 99% of the entire thickness of the film structure.

The film structure comprises at least one heat-seal layer comprising the seal-layer blends described above.

The film structure may be prepared so that a heat-seal layer is provided directly on one side of the base layer, or the film structure may be prepared so that one or more intermediate, or tie, layers are between the base layer and heat-seal layer. The film structure may be prepared, moreover, with one or more additional layers on the side of the base layer opposite the side of the heat-seal layer.

For example, the film structure may be represented, in simplified form, as having a structure "AC", "ACE", "ABCE", "ACDE", or "ABCDE", wherein "C" represents a base layer, "B" and "D" represent intermediate layers adjacent to the base layer, "A" represents a heat-seal layer according to the present invention, which is either adjacent to the base layer "C" or adjacent to the outer surface of layer "B", and "E" represents a skin layer, which is either adjacent to the base layer "C" or adjacent to the outer surface of layer "D". Layers "A" and "B" may be the same or different, layers "D" and "E" may be the same or different, layers "B" and "D" may be the same or different, and layers "A" and "E" may be the same or different. Preferably, layers "A" and "C" are different. Additionally, structures containing more than five layers are contemplated, e.g., six, seven, eight, nine, or more layers.

If present, the skin layer on the side of the base layer opposite the heat-seal layer is either adjacent to the base layer or separated from the base layer by one or more intermediate layers. The skin layer may comprise a polymeric matrix comprising any of the film-forming polymers. Suitable film-forming polymers that may be used to form the polymeric matrix of the skin layer include, but are not limited to, syndiotactic polypropylene, low density polyethylene (LDPE), linear low density polyethylene (LLDPE), medium density polyethylene (MDPE), high density polyethylene (HDPE), ethylene-vinyl acetate copolymers, ethylene-vinyl alcohol copolymers, nylons, polymers grafted with functional groups, and/or blends of any of these.

The intermediate layer(s) that is optionally provided between the base layer and the heat-seal layer and/or the base layer and the skin layer also comprises a polymeric matrix comprising any of the film-forming polymers. Suitable film-forming polymers for forming the polymeric matrix of the intermediate layer(s) include, but are not limited to, any of the film-forming polymers disclosed above with reference to the skin layer.

Alternatively, the outer surface of the present film structures opposite the heat-seal layer may have applied thereto a substrate, such as another polymer film or laminate, a cellulosic web(s), e.g., numerous varieties of paper, such as corrugated paperboard, craft paper, glassine, and cartonboard, nonwoven tissue, e.g., spunbonded polyolefin fiber, meltblown microfibers, etc. The application may employ a suitable adhesive, e.g., a hot melt adhesive, such as low density polyethylene, ethylene-methacrylate copolymer, a water-based adhesive, such as polyvinylidene chloride latex, and the like.

Additives

Additives that may be present in one or more layers of the multi-layer films of this invention include, but are not limited to, opacifying agents, pigments, colorants, cavitating agents, slip agents, antioxidants, anti-fog agents, anti-static agents, anti-block agents, fillers, moisture barrier additives, gas barrier additives and combinations thereof. Such additives may be used in effective amounts, which vary depending upon the property required.

Examples of suitable opacifying agents, pigments or colorants are iron oxide, carbon black, aluminum, titanium dioxide ($TiO_2$), calcium carbonate ($CaCO_3$), polybutylene terephthalate (PBT), talc, beta nucleating agents, and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. Cavitation may also be introduced by beta-cavitation, which includes creating beta-form crystals of polypropylene and converting at least some of the beta-crystals to alpha-form polypropylene crystals and creating a small void remaining after the conversion. Preferred beta-cavitated embodiments of the core layer may also comprise a beta-crystalline nucleating agent. Substantially any beta-crystalline nucleating agent ("beta nucleating agent" or "beta nucleator") may be used. The average diameter of the void-initiating particles typically may be from about 0.1 to 10 µm.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. An example of a slip additive that may be useful is erucamide.

Non-migratory slip agents, used in one or more skin layers of the multi-layer films, may include polymethyl methacrylate (PMMA) or silicone oil. The non-migratory slip agent may have a mean particle size in the range of from about 0.5 µm to 8 µm, or 1 µm to 5 µm, or 2 µm to 4 µm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes is also contemplated.

Suitable anti-oxidants may include phenolic anti-oxidants, such as IRGANOX® 1010 (commercially available from Ciba-Geigy Company of Switzerland). Such an anti-oxidant is generally used in amounts ranging from 0.1 wt % to 2 wt %, based on the total weight of the layer(s) to which it is added.

Anti-static agents may include alkali metal sulfonates, polyether-modified polydiorganosiloxanes, polyalkylphenylsiloxanes, and tertiary amines. Such anti-static agents may be used in amounts ranging from about 0.05 wt % to 3 wt %, based upon the total weight of the layer(s).

Examples of suitable anti-blocking agents may include silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such an anti-blocking agent comprises an effective amount up to about 3000 ppm of the weight of the layer(s) to which it is added.

Fillers may include finely divided inorganic solid materials such as silica, fumed silica, diatomaceous earth, calcium carbonate, calcium silicate, aluminum silicate, kaolin, talc, bentonite, clay and pulp.

Suitable moisture and gas barrier additives may include effective amounts of low-molecular weight resins, hydrocarbon resins, particularly petroleum resins, styrene resins, cyclopentadiene resins, and terpene resins.

Optionally, one or more skin layers may be compounded with a wax or coated with a wax-containing coating, for lubricity, in amounts ranging from 2 wt % to 15 wt % based on the total weight of the skin layer. Any conventional wax, such as, but not limited to, carnauba wax (commercially available from Michelman Corporation of Cincinnati, Ohio) that is useful in thermoplastic films is contemplated.

Film Orientation

The embodiments of this invention may include uniaxially, biaxially, and non-oriented multi-layer films. Orientation in the direction of extrusion is known as machine direction (MD) orientation. Orientation perpendicular to the direction of extrusion is known as transverse direction (TD) orientation. Orientation may be accomplished by stretching or pulling a film first in the MD followed by TD orientation. Blown films or cast films may also be oriented by a tenter-frame orientation subsequent to the film extrusion process, again in one or both directions. Orientation may be sequential or simultaneous, depending upon the desired film features. Preferred orientation ratios are commonly from between about three to about six times in the machine direction and between about four to about ten times in the transverse direction. Typical commercial orientation processes are biaxially oriented polypropylene (BOPP) tenter process, blown film, and LISIM technology. Blown and LISIM processes are particularly well-adapted to fully exploit the low sealing potential of sealant layer formulations discussed in this patent.

Surface Treatment

One or both of the outer surfaces of the multi-layer films may be surface-treated to increase the surface energy to render the film receptive to metallization, coatings, printing inks, lamination, and the like or combinations thereof. The surface treatment can be carried out according to any of the methods known in the art including corona discharge, flame, plasma, chemical treatment, or treatment by means of a polarized flame.

Metallization

One or both of the outer surfaces of the multi-layer films may be metallized. Such layers may be metallized using conventional methods, such as vacuum metallization by deposition of a metal layer such as aluminum, copper, silver, chromium, or mixtures thereof.

Coating

In some embodiments, one or more coatings, such as for barrier, printing and/or processing, may be applied to one or both of the outer surfaces of the multi-layer films. Such coatings may include acrylic polymers, such as ethylene acrylic acid (EAA), ethylene methyl acrylate copolymers (EMA), polyvinylidene chloride (PVdC), poly(vinyl)alcohol (PVOH) and EVOH. The coatings are preferably applied by an emulsion coating technique, but may also be applied by co-extrusion and/or lamination.

The PVdC coatings that are suitable for use with the multi-layer films are any of the known PVdC compositions heretofore employed as coatings in film manufacturing operations, e.g., any of the PVdC materials described in U.S. Pat. No. 4,214,039, U.S. Pat. No. 4,447,494, U.S. Pat. No. 4,961,992, U.S. Pat. No. 5,019,447, and U.S. Pat. No. 5,057,177.

Known vinyl alcohol-based coatings, such as PVOH and EVOH, that are suitable for use with the multi-layer films include VINOL™ 125 or VINOL™ 325 (both commercially available from Air Products, Inc. of Allentown, Pa.). Other PVOH coatings are described in U.S. Pat. No. 5,230,963.

Before applying the coating composition to the appropriate substrate, the outer surface of the film may be treated as noted herein to increase its surface energy. This treatment can be accomplished by employing known techniques, such as flame treatment, plasma, corona discharge, film chlorination, e.g., exposure of the film surface to gaseous chlorine, treatment with oxidizing agents such as chromic acid, hot air or steam treatment, and the like. Although any of these techniques is effectively employed to pre-treat the film surface, a frequently preferred method is corona discharge, an electronic treatment method that includes exposing the film surface to a high voltage corona discharge while passing the film between a pair of spaced electrodes. After treatment of the film surface, the coating composition is then applied thereto.

An intermediate primer coating may be applied to the multi-layer films. In this case, the film may be first treated by one of the foregoing methods to provide increased active adhesive sites thereon and to the thus-treated film surface there may be subsequently applied a continuous coating of a primer material. Such primer materials are well known in the art and include, for example, epoxy and poly(ethylene imine) (PEI) materials. U.S. Pat. No. 3,753,769, U.S. Pat. No. 4,058,645 and U.S. Pat. No. 4,439,493, disclose the use and application of such primers. The primer provides an overall adhesively active surface for thorough and secure bonding with the subsequently applied coating composition and can be applied to the film by conventional solution coating means, for example, by roller application.

The coating composition can be applied to the film as a solution, for example, one prepared with an organic solvent such as an alcohol, ketone, ester, and the like. However, since the coating composition can contain insoluble, finely divided inorganic materials that may be difficult to keep well dispersed in organic solvents, it is preferable that the coating composition be applied to the treated surface in any convenient manner, such as by gravure coating, roll, coating, dipping, spraying, and the like. The excess aqueous solution can be removed by squeeze rolls, doctor knives, and the like.

The film can be stretched in the MD, coated with the coating composition and then stretched perpendicular in the TD. In yet another embodiment, the coating can be carried out after biaxial orientation is completed.

The coating composition may be applied in such an amount that there will be deposited upon drying a smooth, evenly distributed layer. The coating may be dried by hot air, radiant heat, or by any other convenient means. Coatings may have coating weights ranging from 0.5 g/m$^2$ to 1.6 g/m$^2$ for conventional PVOH coatings, 0.78 g/m$^2$ to 2.33 g/m$^2$ for conventional acrylic and low temperature seal coatings (LTSC) and 1.6 g/m$^2$ to 6.2 g/m$^2$ for conventional PVdC coatings.

EXAMPLES

Materials

Vistamaxx™ 6100—propylene-ethylene elastomer having a density of 0.855 g/cm3, an MFR (2.16 kg @ 230° C., ASTM D-1238) of 3.0 g/10 min, an Mw/Mn of 2, a melting point of 46.3° C. and a propylene content of 77.8 mol %, available from ExxonMobil Chemical Company.

Vistamaxx™ 3000—propylene-ethylene elastomer having a density of 0.871 g/cm3, an MFR (2.16 kg @ 230° C., ASTM D-1238) of 8.0 g/10 min, an Mw/Mn of 2, a melting point of 61.8° C. and a propylene content of 84.4 mol %, available from ExxonMobil Chemical Company.

PP4712—polypropylene homopolymer having a density of 0.900 g/cm3 and an MFR (2.16 kg @ 230° C., ASTM D-1238) of 2.8 g/10 min., available from ExxonMobil Chemical Company.

Terpolymer 1—an ethylene-butene-propylene terpolymer having an MFR (2.16 kg @ 230° C., ASTM D-1238) of 5.6 g/10 min. and an ethylene content of 3.2 wt %, a butene content of 10.9 wt %, with the remainder being propylene.

Terpolymer 2—an ethylene-butene-propylene terpolymer having an MFR (2.16 kg @ 230° C., ASTM D-1238) of 5.6 g/10 min., an ethylene content of 3.5 wt %, a butene content of 6.4 wt %, with the remainder being propylene.

Eltex™ KS413—a propylene-ethylene random copolymer (5 wt % ethylene) having a density of 0.895 g/cm3 and an MFR (2.16 kg @ 230° C., ASTM D-1238) of 7.3 g/10 min., available from Innovene.

Co-extruded two layer cast films ~2.25 mil thick were made on a Killion cast line using the following process conditions:

TABLE 1

| | Base Layer Extruder | Outer Layer Extruder |
| --- | --- | --- |
| Zone 1 (° C.) | 183 | 168 |
| Zone 2 (° C.) | 215 | 213 |
| Zone 3 (° C.) | 232 | 232 |
| Adapter 1 (° C.) | 236 | 238 |
| Adapter 2 (° C.) | 238 | 238 |
| Die/Feedblock (° C.) | 254 | |
| Pressure (MPa) | 4.7 | 4.0 |
| Chill Roll Temperature (° C.) | 14 | |

The base layer was 100 wt % of PP4712 and was 75% of the total film thickness. The outer sealing layer contained a blend of polymers in quantities shown in Table 3, and was the remaining 25% of the total film thickness. The heat seal layer compositions are described in Table 3. Examples 1-4 are comparative, while examples 5-18 represent inventive films. The films of Examples 8-17 additionally contain slip agent (erucamide) and antiblock (talc) to protect against roll blocking. Each film contained a total of 1500 ppm of slip in the total structure split between the base layer and heat seal layer. Each heat seal layer contained 700 ppm slip and 4000 ppm of antiblock relative to the Vistamaxx™ elastomer content in the blend. Remaining (make-up) slip agent was added to the base layer to yield a total of 1500 ppm. Various film properties were measured using the methods listed in Table 2 below. Seal initiation temperature was the temperature at which the seal strength was 200 g/25.4 mm. HTIT=Hot Tack Initiation Temperature, which is the temperature at which seal strength is 1N/25.4 mm.

TABLE 2

| Film Tests and Methods | |
| --- | --- |
| Test | Test Method |
| Tensile Strength | ASTM D882 |
| Elongation | ASTM D882 |
| 1% Secant Modulus | ASTM D882 |
| Elmendorf Tear | ASTM D1922 |
| Haze | ASTM D1003 |
| Gloss | ASTM 2457 |

For the following test methods, the film samples were conditioned at 23°±2° C. and 50%±5% relative humidity for at least 40 hours.

Puncture resistance was measured as follows. 15.24 centimeter wide samples were cut and gauged for thickness. A United "SFM-1" Testing Machine was then used to measure puncture resistance. The average peak load and break energy values of five specimens for each film sample tested are used to compile the final test results.

Coefficient of friction was measured as follows. A sled die was used for cutting the specimens. The test specimen that was to be attached to the platform was cut approximately 35.6 centimeters in the machine direction and approximately 12.7 centimeters in the transverse direction. A TMI Monitor/Slip & Friction Tester, Model 32-06-00 was then used to measure COF.

Seal Strength was measured using a Theller Heat Sealer Model PC using a seal pressure of 0.5 MPa, a seal/dwell time of 1 second and a peel speed of 50.8 cm/min.

Hot tack was measured as follows. Films samples of 12.7 centimeters long in the MD direction were cut from a film roll. Backing tape was applied and the film was cut in 34.3 centimeter strips, across the film side by side so that the length of the tape lay in the MD direction and the work proceeded across in the TD direction. A tape roller was used to apply laminating pressure to the tape strips, anchoring them firmly to the sample specimen. Taped samples were then precision cut in the MD, across the web, with a dedicated 25.4 mm sample strip cutter. Hot tack was measured using a J&B Hot Tack Tester 3000 using the following conditions: seal pressure=0.5 N/mm$^2$, seal time=0.5 seconds, cool (delay) time=0.4 seconds, peel speed=200 mm/s, and sample width=25.4 mm. The values reported are the average of four measurements.

TABLE 3

| | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Composition (wt %) | | | | | | | | | | | | | | | | | | |
| Vistamaxx ™ 6100 | 0 | 0 | 0 | 0 | 10 | 20 | 0 | 0 | 5 | 10 | 30 | 50 | 60 | 0 | 0 | 0 | 0 | 0 |
| Vistamaxx ™ 3000 | 0 | 0 | 0 | 0 | 0 | 0 | 10 | 20 | 0 | 0 | 0 | 0 | 0 | 10 | 30 | 50 | 80 | 90 |
| PP 4712 E1 | 100 | 0 | 0 | 0 | 0 | 0 | 0 | 0 | 95 | 90 | 70 | 50 | 40 | 90 | 70 | 50 | 20 | 10 |
| Terpolymer 1 | 0 | 100 | 0 | 0 | 0 | 0 | 0 | 0 | 0 | 0 | 0 | 0 | 0 | 0 | 0 | 0 | 0 | 0 |
| Terpolymer 2 | 0 | 0 | 100 | 0 | 0 | 0 | 0 | 0 | 0 | 0 | 0 | 0 | 0 | 0 | 0 | 0 | 0 | 0 |
| Eltex ™ KS413 | 0 | 0 | 0 | 100 | 90 | 80 | 90 | 80 | 0 | 0 | 0 | 0 | 0 | 0 | 0 | 0 | 0 | 0 |
| Seal Initiation Temperature (° C.) | 134 | 104 | 121 | 110 | 109 | 106 | 120 | 115 | 128 | 128 | 120 | 120 | 118 | 131 | 129 | 127 | 106 | 72 |
| Seal Strength (g/25.4 mm) | | | | | | | | | | | | | | | | | | |
| @105° C. | 0 | 227 | 0 | 109 | 114 | 150 | 150 | 73 | 95 | 0 | 0 | 0 | 0 | 0 | 0 | 0 | 132 | 1993 |
| @115° C. | 0 | 431 | 95 | 372 | 672 | 2361 | 109 | 177 | 0 | 54 | 109 | 86 | 118 | 0 | 68 | 82 | 1557 | 2319 |
| @125° C. | 54 | 767 | 345 | 622 | 3137 | 3037 | 3346 | 3378 | 150 | 141 | 313 | 327 | 413 | 127 | 132 | 118 | 2565 | 2547 |
| Hot Tack Initiation Temperature (HTIT) (° C.) | 121 | 92 | 107 | 92 | 86 | 85 | 81 | 81 | 112 | 109 | 100 | 90 | 82 | 110 | 99 | 90 | 95 | 72 |
| Hot Tack Peak (N) | 5.7 | 6 | 13 | 13 | 10 | 15 | 12 | 11 | 14 | 6 | 9 | 19 | 22 | 6 | 9 | 12 | 18 | 26 |
| Hot Tack Peak Force Temperature (HTPFT) (° C.) | 145 | 150 | 130 | 125 | 126 | 120 | 125 | 120 | 145 | 142 | 140 | 112 | 98 | 145 | 140 | 135 | 107 | 90 |
| HTPFT - HTIT (° C.) | 24 | 58 | 23 | 33 | 40 | 35 | 44 | 39 | 33 | 33 | 30 | 22 | 16 | 35 | 41 | 17 | 12 | 18 |

TABLE 4

| | Example | | | | | | | | |
|---|---|---|---|---|---|---|---|---|---|
| | 1 | 2 | 3 | 4 | 5 | 6 | 7 | 8 | 9 |
| 1% Secant (MPa) | | | | | | | | | |
| MD | 0.75 | 0.48 | 0.48 | 0.53 | 0.52 | 0.48 | 0.53 | 0.51 | 0.69 |
| TD | 0.73 | 0.49 | 0.46 | 0.55 | 0.52 | 0.46 | 0.52 | 0.50 | 0.67 |
| Tensile Yield Strength (MPa) | | | | | | | | | |
| MD | 23.1 | 17.2 | 17.4 | 18.7 | 17.4 | 16.0 | 17.8 | 16.5 | 22.0 |
| TD | 23.0 | 17.0 | 17.1 | 18.7 | 17.3 | 16.2 | 17.9 | 17.1 | 22.2 |
| @ 200% MD | 16.7 | 13.7 | 13.6 | 14.6 | 13.9 | 12.9 | 14.0 | 14.8 | 15.8 |
| @ 200% TD | 15.6 | 13.0 | 12.5 | 14.3 | 13.6 | 12.3 | 12.7 | 13.3 | 15.0 |
| Elongation @ Yield (%) | | | | | | | | | |
| MD | 5.9 | 5.3 | 5.5 | 5.5 | 5.6 | 5.3 | 5.5 | 5.0 | 5.6 |
| TD | 5.4 | 5.1 | 5.4 | 5.4 | 5.5 | 5.6 | 5.4 | 5.5 | 5.4 |
| Tensile Strength (MPa) | | | | | | | | | |
| MD | 66.0 | 63.2 | 60.8 | 62.2 | 61.7 | 59.6 | 62.9 | 58.4 | 65.6 |
| TD | 54.8 | 51.3 | 51.0 | 50.3 | 50.5 | 50.9 | 52.2 | 52.0 | 56.0 |
| Elongation @ Break (%) | | | | | | | | | |
| MD | 715 | 715 | 757 | 688 | 727 | 730 | 699 | 723 | 762 |
| TD | 784 | 758 | 778 | 767 | 762 | 775 | 777 | 783 | 793 |
| Pro-Tear | | | | | | | | | |
| MD (g/μm) | 1.7 | 1.9 | 1.7 | 1.4 | 1.5 | 1.6 | 1.4 | 1.6 | 1.8 |
| TD (g/μm) | 3.6 | 19.4 | 5.4 | 5.9 | 4.6 | 6.9 | 5.9 | 7.9 | 3.5 |
| Haze (%) | 2.1 | 1.5 | 1.2 | 2.3 | 1.8 | 1.6 | 2.3 | 1.7 | 2.0 |

TABLE 4-continued

| | | | | | | | | | |
|---|---|---|---|---|---|---|---|---|---|
| Gloss | | | | | | | | | |
| MD | 86 | 87 | 89 | 85 | 87 | 87 | 85 | 87 | 85 |
| TD | 86 | 86 | 88 | 85 | 86 | 87 | 85 | 86 | 84 |
| Puncture | | | | | | | | | |
| Peak Load (N) | 76.1 | 71.6 | 72.5 | 64.9 | 63.6 | 64.9 | 66.7 | 67.6 | 65.8 |
| Peak (N/μm) | 1.4 | 1.3 | 1.5 | 1.2 | 1.2 | 1.2 | 1.2 | 1.3 | 1.1 |
| Break Energy (J) | 4.0 | 4.4 | 4.7 | 3.8 | 4.1 | 4.4 | 4.2 | 4.6 | 3.2 |
| Break Energy (mJ/μm) | 72 | 78 | 100 | 69 | 75 | 80 | 76 | 86 | 53 |
| Gauge (μm) | | | | | | | | | |
| Average | 56 | 57 | 47 | 56 | 54 | 54 | 55 | 53 | 60 |
| Low | 50 | 52 | 38 | 49 | 47 | 49 | 46 | 42 | 55 |
| High | 60 | 65 | 52 | 58 | 57 | 57 | 60 | 67 | 63 |
| COF (I/I) | | | | | | | | | |
| Static | 0.951 | >1 | >1 | >1 | >1 | >1 | >1 | >1 | >1 |
| Kinetic | 0.833 | >1 | >1 | >1 | >1 | >1 | >1 | >1 | >1 |

| | Example | | | | | | | | |
|---|---|---|---|---|---|---|---|---|---|
| | 10 | 11 | 12 | 13 | 14 | 15 | 16 | 17 | 18 |
| 1% Secant (MPa) | | | | | | | | | |
| MD | 0.65 | 0.52 | 0.44 | 0.44 | 0.66 | 0.50 | 0.48 | 0.41 | 0.40 |
| TD | 0.63 | 0.51 | 0.43 | 0.42 | 0.64 | 0.50 | 0.46 | 0.40 | 0.40 |
| Tensile Yield Strength (MPa) | | | | | | | | | |
| MD | 21.0 | 17.3 | 14.8 | 14.2 | 21.6 | 17.1 | 15.9 | 13.2 | 13.1 |
| TD | 21.1 | 17.3 | 14.4 | 13.9 | 21.4 | 17.1 | 15.6 | 13.1 | 13.1 |
| @ 200% MD | 15.8 | 14.0 | 12.6 | 12.0 | 15.5 | 13.8 | 13.2 | 11.0 | 11.1 |
| @ 200% TD | 14.8 | 14.5 | 11.1 | 10.6 | 15.8 | 13.1 | 12.1 | 10.3 | 10.3 |
| Elongation @ Yield (%) | | | | | | | | | |
| MD | 5.5 | 5.7 | 5.6 | 5.5 | 5.8 | 5.4 | 5.7 | 5.6 | 5.2 |
| TD | 5.5 | 5.7 | 5.3 | 5.5 | 5.6 | 5.4 | 5.4 | 5.3 | 5.3 |
| Tensile Strength (MPa) | | | | | | | | | |
| MD | 65.8 | 63.8 | 62.1 | 58.9 | 64.5 | 60.8 | 61.1 | 54.1 | 53.1 |
| TD | 55.4 | 53.6 | 53.0 | 50.1 | 53.1 | 52.5 | 53.0 | 48.4 | 47.3 |
| Elongation @ Break (%) | | | | | | | | | |
| MD | 765 | 754 | 771 | 773 | 727 | 754 | 762 | 757 | 743 |
| TD | 803 | 803 | 818 | 808 | 785 | 806 | 819 | 789 | 789 |
| Pro-Tear | | | | | | | | | |
| MD (g/μm) | 1.7 | 1.7 | 2.4 | 2.7 | 1.6 | 1.6 | 2.0 | 2.7 | 2.5 |
| TD (g/μm) | 3.6 | 6.8 | 16.9 | 16.6 | 3.6 | 6.7 | 6.7 | 17.0 | 14.2 |
| Haze (%) | 2.0 | 1.7 | 2.3 | 2.7 | 2.2 | 2.2 | 2.3 | 3.0 | 3.2 |
| Gloss | | | | | | | | | |
| MD | 87 | 88 | 87 | 86 | 86 | 87 | 86 | 84 | 84 |
| TD | 86 | 88 | 86 | 85 | 85 | 86 | 84 | 83 | 83 |
| Puncture | | | | | | | | | |
| Peak Load (N) | 63.6 | 67.2 | 59.6 | 56.9 | 62.3 | 66.7 | 64.9 | 57.4 | 58.3 |
| Peak (N/μm) | 1.1 | 1.2 | 1.1 | 1.0 | 1.2 | 1.1 | 1.1 | 1.0 | 1.0 |
| Break Energy (J) | 3.2 | 4.1 | 3.9 | 3.6 | 3.1 | 3.6 | 3.9 | 3.5 | 3.9 |
| Break Energy (mJ/μm) | 55 | 74 | 68 | 63 | 57 | 60 | 68 | 59 | 69 |
| Gauge (μm) | | | | | | | | | |
| Average | 59 | 56 | 57 | 57 | 54 | 59 | 57 | 59 | 57 |
| Low | 54 | 50 | 52 | 52 | 47 | 54 | 50 | 53 | 53 |
| High | 62 | 59 | 60 | 61 | 58 | 63 | 61 | 63 | 61 |

TABLE 4-continued

| COF (I/I) | | | | | | | | | |
|---|---|---|---|---|---|---|---|---|---|
| Static | >1 | >1 | >1 | >1 | 0.713 | 0.083 | 0.076 | 0.142 | 0.343 |
| Kinetic | >1 | >1 | >1 | >1 | 0.617 | 0.067 | 0.061 | 0.112 | 0.184 |

The data in the Tables highlight lower seal initiation temperature (SIT) when Vistamaxx™ elastomers were used in a blend with polypropylene relative to the homopolymer polypropylene in example 1. The Vistamaxx™ elastomer/Eltex® RCP blends were used in examples 5-8. According to the data, these blends can match the SIT performance of the high performance terpolymer sealants (example 2) used in the market today. These Vistamaxx™ elastomer/RCP blends also offer very high seal strength within the same temperature window. Examples 17 and 18 containing 80% and 90% Vistamaxx™ 3000 elastomer, respectively, show very robust sealing performance. That is, low SIT (as low as 72° C.), broad seal window, with extremely high seal strengths.

The data in the Table also highlight lower HTIT when Vistamaxx™ elastomer was used in a blend with polypropylene relative to homopolymer PP alone (example 1). In general, lower HTIT is preferred. In many cases, seal layers containing Vistamaxx™ elastomers, used in blends, show better performance versus the industry sealant resins (examples 2 and 3). In addition, seal layers containing Vistamaxx™ elastomers, used in blends, afford a stronger seal relative to polypropylene alone and many compositions (higher levels of Vistamaxx™ elastomer in homopolymer PP blends) give stronger seal performance versus industry standard sealant resins.

Seal layers containing blends comprising Vistamaxx™ elastomers show a good balance of key film properties. In some cases, the properties are better than the conventional sealant resins (examples 2 and 3). Tear properties were improved over homopolymer PP (example 1) and in some cases better than industry standard controls. This is most evident in the transverse direction (TD). Note that when Vistamaxx™ elastomer content increases in blends with Eltex™ KS413 (e.g., examples 5-8), tear properties improve in both MD and TD. Puncture resistance also improves. These properties are both proxy for overall film toughness. Films produced with Vistamaxx/PP blends where the Vistamaxx 3000 content exceeded 80 wt. %, showed a unique combination of low SIT and low COF values. Such a combination is very difficult to achieve with current low SIT sealant polymers.

Further tests were performed with Terpolymers 1 and 2 in the same manner as previously described unless otherwise mentioned. The co-extruded films had the following compositions with comparatives tested simultaneously shown side by side:

TABLE 5

Co-extruded Cast Films,

Composition (weight percent)

| Sample # | Vistamaxx 6100[1] | PP4712 E1 | C2-C3-C4 Terpolymer 1 | C2-C3-C4 Terpolymer 2 |
|---|---|---|---|---|
| 002-001 | 0 | 100 | 0 | 0 |
| 002-002 | 0 | 0 | 100 | 0 |
| 014-001 | 0 | 0 | 0 | 100 |
| 014-004 | 5 | 0 | 0 | 95 |
| 014-005 | 10 | 0 | 0 | 90 |
| 014-006 | 20 | 0 | 0 | 80 |

Films #014-004, 005, and 006 contain slip agent (erucamide) and anti-block (talc) to protect against roll blocking. Each film contained a total of 1500 ppm of slip in the total structure split between the base layer and heat seal layer. Each heat seal layer contained 700 ppm slip and 4000 ppm of anti-block relative to the amount Vistamaxx in the blend. Remaining (make-up) slip agent was added to the base PP layer to yield a total of 1500 ppm. Processing conditions are highlighted in Table 6 below.

TABLE 6

| | Typical Conditions | |
|---|---|---|
| | A Extruder | B Extruder |
| Zone 1 (° C.) | 182 | 168 |
| Zone 2 (° C.) | 216 | 213 |
| Zone 3 (° C.) | 232 | 232 |
| Adapter 1 (° C.) | 238 | 238 |
| Adapter 2 (° C.) | 238 | 238 |
| Die/Feedblock (° C.) | 254 | |
| Pressure (MPa) | 3.2–3.7 | 3.7 |
| Chill Roll Temperature (° C.) | 15 | |

Table 7 below displays the heat seal strength data for all the films. Films 014-004, -005, and -006 contain the inventive seal layer blends.

TABLE 7

Co-extruded cast films

| | | Seal strength (g/25.4 mm) @ | | |
|---|---|---|---|---|
| | Seal Initiation | | | |
| Film # | Temperature (° C.)[1] | 105° C. | 115° C. | 125° C. |
| 002-001 | 134 | 0 | 0 | 54 |
| 002-002 | 104 | 227 | 431 | 767 |
| 014-001 | 122 | 0 | 94 | 338 |
| 014-004 | 107 | 116 | 806 | 2814 |
| 014-005 | 102 | 304 | 2329 | 2894 |
| 014-006 | 99 | 459 | 2765 | 2814 |

[1]Seal Initiation Temperature = Temperature at which seal strength is 200 g/25.4 mm.

Table 7 highlights lower seal initiation temperature when Vistamaxx is used in a blend with polypropylene terpolymer relative to the terpolymer by itself (films #002-002 and 014-001). According to the data, even with Vistamaxx levels as low as 5 wt %, the seal initiation temperature is lowered by 15° C. relative to 014-001. The 15° C. enhancement represents an improvement of 12% relative the terpolymer alone.

Figure 1:
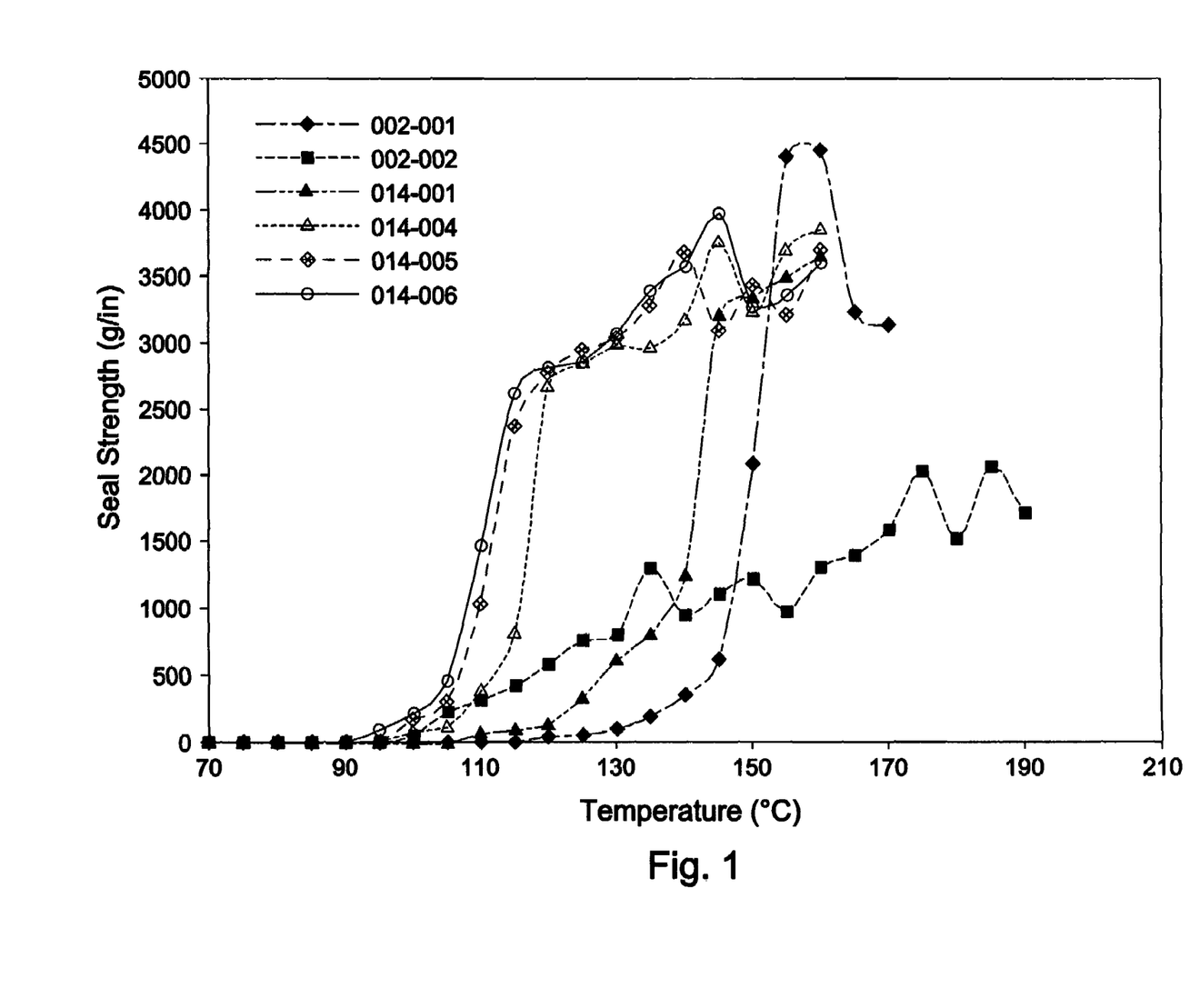
FIG. 1 and FIG. 2 are graphs illustrating the impact on the heat seal and hot tack temperatures of the compositions of the invention.

These Vistamaxx/terpolymer PP blends also offer much higher seal strength within the same temperature range. Table 7 illustrates seal strengths at 125° C. that are an order of magnitude higher than the terpolymer polypropylene resins. The data are shown graphically in FIG. 1.

TABLE 8

| Film # | HTIT (° C.)[1] | HTPFT (° C.)[2] | Peak$_f$(N) |
|---|---|---|---|
| 002-001 | 121 | 145 | 5.7 |
| 002-002 | 92 | 150 | 6.0 |
| 014-001 | 106 | 130 | 12.4 |
| 014-004 | 84 | 130 | 12.0 |
| 014-005 | 76 | 125 | 12.5 |
| 014-006 | 76 | 125 | 13.0 |

Figure 2:
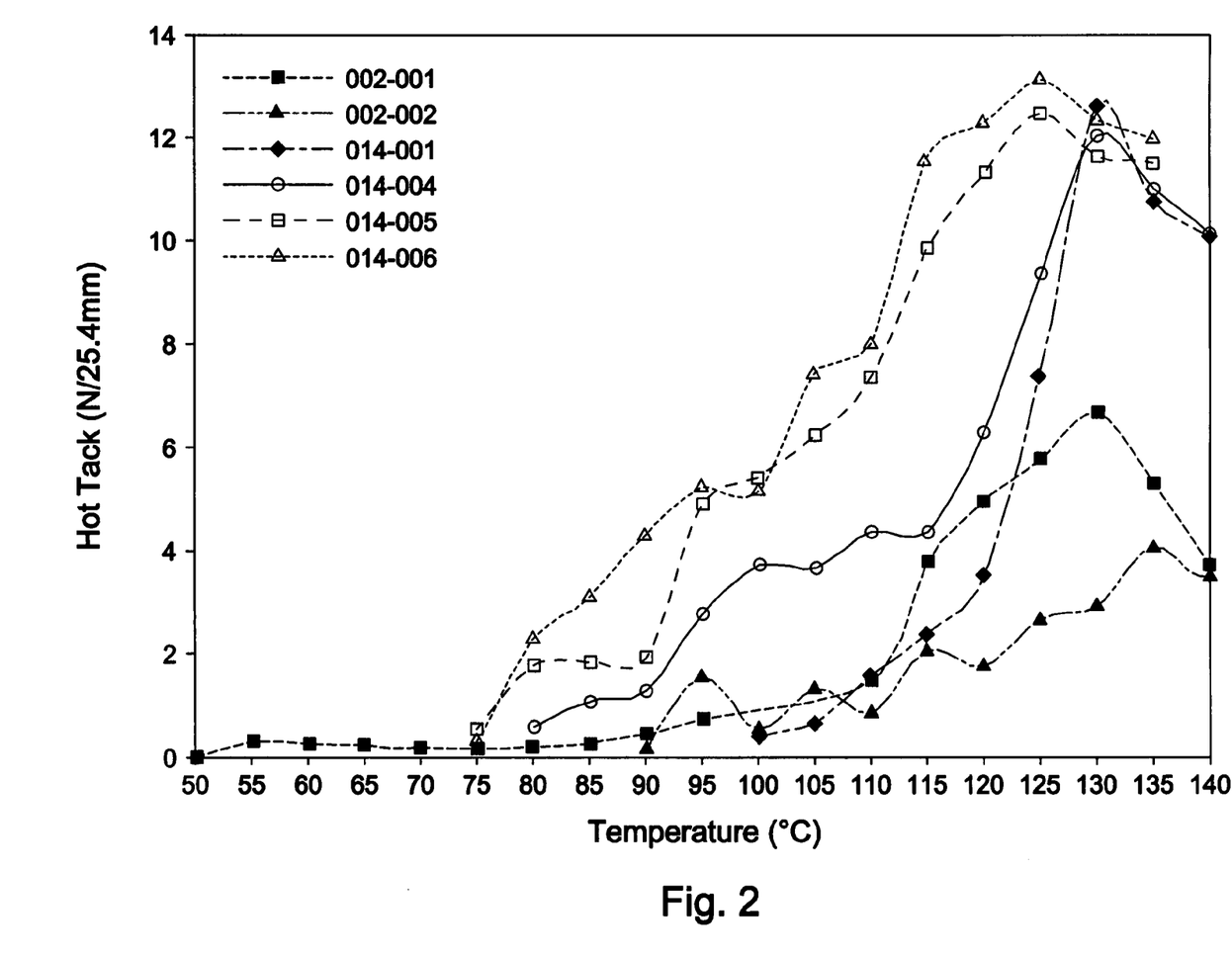

Table 8 displays the hot tack data for all the films. Films 014-004, -005, and -006 contain the inventive seal layer blends.
[1]HTIT = Hot Tack Initiation Temperature = Term at which seal strength is 1N/in.
[2]HTPFT = Hot Tack Peak Force Temperature Table 8 highlights key hot tack data when Vistamaxx is used in a blend with polypropylene terpolymer relative to homopolymer PP and terpolymer PP alone. In general, lower HTIT is preferred. In all cases Vistamaxx blends show better performance versus the industry sealant resins (films#002-002 and 014-001). In addition, Vistamaxx blends afford a very high seal strength as delineated by peak force. The results are graphically illustrated in FIG. 2.

Table 9 below highlights key film property data.

TABLE 9

| | Sample ID | | | | | |
|---|---|---|---|---|---|---|
| | 002-001 | 002-002 | 014-001 | 014-004 | 014-005 | 014-006 |
| 1% Secant (MPa) | | | | | | |
| MD | 752 | 481 | 479 | 462 | 459 | 439 |
| TD | 734 | 486 | 465 | 449 | 428 | 427 |
| Tensile Yield Strength (MPa) | | | | | | |
| MD | 23 | 17 | 17 | 17 | 16 | 16 |
| TD | 23 | 17 | 17 | 17 | 16 | 15 |
| @ 200% MD | 17 | 14 | 14 | 13 | 13 | 13 |
| Elongation @ Yield (%) | | | | | | |
| MD | 5.9 | 5.3 | 5.5 | 6.3 | 5.7 | 6.1 |
| TD | 5.4 | 5.1 | 5.4 | 5.9 | 6.3 | 6.1 |
| Tensile Strength (MPa) | | | | | | |
| MD | 66 | 63 | 61 | 62 | 62 | 62 |
| TD | 55 | 51 | 51 | 51 | 56 | 52 |
| Elongation @ Break (%) | | | | | | |
| MD | 715 | 715 | 757 | 794 | 768 | 777 |
| TD | 784 | 758 | 778 | 794 | 851 | 834 |
| Elmendorf Tear | | | | | | |
| MD (g) | 94 | 108 | 84 | 94 | 100 | 105 |
| TD (g) | 201 | 1032 | 280 | 274 | 344 | 391 |
| MD (g/µm) | 1.7 | 1.9 | 1.7 | 1.7 | 1.8 | 1.9 |
| TD (g/µm) | 3.6 | 19.4 | 5.4 | 5.1 | 6.1 | 6.9 |
| Haze (%) | 2.1 | 1.5 | 1.2 | 1.6 | 1.8 | 1.9 |
| Gloss | | | | | | |
| MD | 86 | 87 | 89 | 88 | 87 | 87 |
| TD | 86 | 86 | 88 | 87 | 85 | 86 |

TABLE 9-continued

| | Sample ID | | | | | |
|---|---|---|---|---|---|---|
| | 002-001 | 002-002 | 014-001 | 014-004 | 014-005 | 014-006 |
| Puncture | | | | | | |
| Peak Load (N) | 76.0 | 71.5 | 72.3 | 70.5 | 70.8 | 70.4 |
| Peak (N/µm) | 1.4 | 1.3 | 1.5 | 1.4 | 1.4 | 1.4 |
| Break Energy (J) | 4.0 | 4.4 | 4.7 | 4.6 | 4.5 | 4.6 |
| Break Energy (mJ/µm) | 71.5 | 78.1 | 100.2 | 88.3 | 88.5 | 90.1 |

As shown in Table 9, Vistamaxx compositions show a good balance of key film properties. In some cases, better than the incumbent sealant resins. Tear properties especially are improved over homopolymer PP (film #1) and terpolymer control 014-001. In addition, puncture resistance also improves as Vistamaxx content increases, and is higher than the base PP (i.e. film#002-001).

The foregoing examples were based on the use of various grades of Vistamaxx™ specialty elastomers as the second polymer component (SPC) of the heat-seal layer. It will be understood by persons skilled in the art that similar results would be expected if other similar polymers (e.g., those sold under the tradename Versify™ by The Dow Chemical Company) were used in place of the Vistamaxx™ elastomers.

All documents described herein are incorporated by reference, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. A heat sealable film structure comprising:
   (a) an unoriented or uniaxially oriented base layer comprising a metallocene-catalyzed isotactic polypropylene homopolymer having an isotacticity of from about 80 to 99%, a melting point from about 155° C. to about 165° C., and a melt flow rate (2.16 kg @ 230° C., ASTM D-1238) of from 0.5 g/10 min to about 15 g/10 min; and
   (b) a heat-seal layer having:
      a seal-initiation temperature ≤130° C.; and
      comprising from 80 wt % to 90 wt % of a first polymer component (FPC) and 10 wt % to 20 wt % of a second polymer component (SPC), based on the total weight of FPC and SPC, wherein:
      (i) the FPC comprises a polypropylene copolymer with 2 to 5 wt % comonomer and has a heat of fusion >75 J/g and a melting point ≥105° C.; and
      (ii) the SPC comprises from about 75 wt % to about 95 wt % propylene and from about 8 wt % to about 16 wt % ethylene, the SPC having a melting point of about 25° C. to about 65° C. and a heat of fusion <75 J/g,
   wherein 50 to 99 percent of the heat sealable film thickness is the base layer, and wherein the base layer further comprises a slip agent, and
   the heat seal layer further comprises a slip agent and an anti-blocking agent.

2. The film structure of claim 1, wherein the polypropylene copolymer of the FPC is a propylene-ethylene random copolymer having 5 wt % ethylene, a density of 0.895 g/cm³, and a melt flow rate (2.16 kg @ 230° C., ASTM D-1238) of 7.3 g/10 min.

3. The film structure of claim 1, wherein the SPC further comprises from about 0.1 to about 10 wt % diene.

4. The film structure of claim 3, wherein the diene is selected from 1,4-hexadiene, ethylidene norbornene (ENB), and 5-vinyl-2-norbornene (VNB).

5. The film structure of claim 1, further comprising, on a side of the base layer opposite the heat-seal layer, a skin layer comprising a film-forming polymer.

6. The film structure of claim 5, further comprising one or more intermediate layers comprising a film-forming polymer between the base layer and the skin layer.

7. The film structure of claim 5, wherein one or both of the heat-seal layer and the skin layer are surface-treated by a treatment selected from the group consisting of corona discharge treatment, flame treatment, and plasma treatment.

8. The film structure of claim 1, further comprising one or more intermediate layers comprising a film-forming polymer between the base layer and heat-seal layer.

9. The film structure of claim 1, further comprising at least one heat seal formed by contacting a surface of the heat seal layer with another film surface under sufficient conditions of heat and pressure to form a seal.

10. A method of manufacturing the film structure of claim 1, comprising the step of coextruding the base layer with the heat-seal layer.

11. The film structure of claim 1, wherein the heat seal layer comprises 90 wt % FPC and 10 wt % SPC.

12. The film structure of claim 1, wherein the heat seal layer comprises 80 wt % FPC and 20 wt % SPC.

13. A heat sealable film structure consisting essentially of:
(a) an unoriented or uniaxially oriented base layer comprising a metallocene-catalyzed isotactic polypropylene homopolymer having an isotacticity of from about 80 to 99%, a melting point from about 155° C. to about 165° C., and a melt flow rate (2.16 kg @ 230° C., ASTM D-1238) of from 0.5 g/10 min to about 15 g/10 min; and
(b) a heat-seal layer having: a seal-initiation temperature ≤130° C.; and comprising a first polymer component (FPC) and a second polymer component (SPC), wherein:
  (i) the FPC comprises a polypropylene copolymer with 2 to 5 wt % comonomer, the FPC having a heat of fusion >75 J/g and a melting point ≥105° C.; and
  (ii) the SPC consists essentially of from about 75 wt % to about 94 wt % propylene and from about 6 wt % to about 25 wt % ethylene, the SPC having a melting point of about 30° C. to about 60° C. and a heat of fusion <50 J/g,
wherein the heat seal layer comprises 80 wt % or 90 wt % FPC and 10 wt % or 20 wt % SPC, and
50 to 99 percent of the heat sealable film thickness is the base layer, and
wherein the base layer further comprises a slip agent and the heat seal layer further comprises a slip agent and an anti-blocking agent.

14. The film of claim 13, wherein the FPC has a melt flow rate (2.16 kg @ 230° C., ASTM D-1238) of 5.6 g/10 min, an ethylene content of 3.5 wt %, a butene content of 6.4 wt %, and the balance propylene; and wherein the SPC comprises a propylene-ethylene random copolymer having a density of 0.855 g/cm³, an MFR (2.16 kg @ 230° C., ASTM D-1238) of 3.0 g/10 min, an Mw/Mn of 2, a melting point of 46.3° C. and a propylene content of 77.8 mol %.

* * * * *